Nov. 16, 1926.  1,607,301
C. R. PELTON ET AL
STERILIZER
Filed May 16, 1923
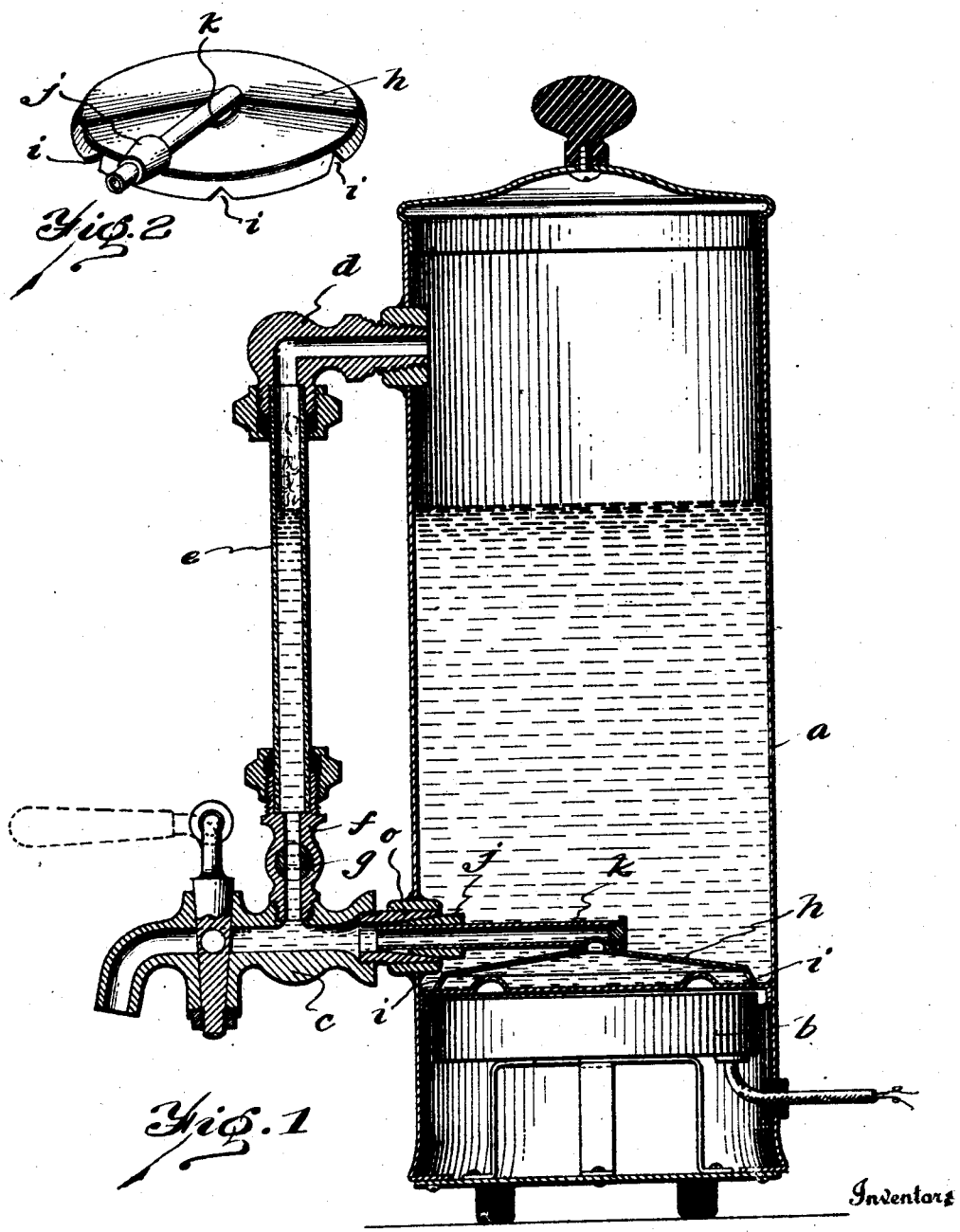

Patented Nov. 16, 1926.

1,607,301

UNITED STATES PATENT OFFICE.

CHAUNCEY R. PELTON AND HAROLD W. HOUGHTON, OF DETROIT, MICHIGAN, ASSIGNORS TO PELTON & CRANE COMPANY, OF DETROIT, MICHIGAN, A CORPORATION OF MICHIGAN.

STERILIZER.

Application filed May 16, 1923. Serial No. 639,310.

This invention relates to sterilizers and has for its object a sterilizer which is arranged to furnish relatively hot water quicker than is ordinarily the case, and which is capable of completely sterilizing all the water that can be drawn through the tap so that none of the water can be contaminated.

It is customary in a sterilizer to provide a gauge for indicating the water level. This gauge is a small glass tube on the outside of the sterilizer and ordinarily the water in this gauge will not reach the boiling point. Consequently, this water is not thoroughly sterilized under the present practice, and it may return into the reservoir or be drawn through the tap thereby frustrating the object of the apparatus which is to provide completely sterile water. It is the object of the present invention to completely eliminate this defect and also to afford a means by which a section of the water can be heated in a very short time and drawn through the tap.

In the drawings:

Fig. 1 is a vertical section of the sterilizer.

Fig. 2 is a perspective of the accessory which we provide for sterilizers to accomplish our object.

$a$ designates the reservoir provided with a heater $b$ underneath; a tap or cock $c$ leads from inside of the reservoir near the bottom; an elbow fixture $d$ screws into the side of the reservoir at the top. A gauge tube $e$ connects this fixture with the valve fixture, which screws into the top of the cock. Suitable packing is provided for the tube as will be observed. When the valve $g$ is open, the water may rise in the gauge tube to the level attained in the reservoir.

It will be quite apparent that the small amount of water isolated in the gauge tube is quite well cut off from the heat of the body of the water and consequently will rarely ever reach the boiling point which is necessary to obtain completely sterilized water. Not only must it reach the boiling point but this must be maintained for comparatively a long period of time in order to completely sterilize the water. This gauge tube is therefore a drawback to the complete success of the sterlizing.

We overcome this defect by providing a circulator which traps a small section of the water in the immediate bottom of the reservoir and directs it into the tap $c$ and up through the gauge tube. The device comprises simply an inverted shallow cup $h$ having notches $i$ for the entry of the water. This we call the trap. A tube $k$ leads from the top of this trap and is provided with a conical plug $j$ for fitting into the conical seat $o$ of the tap.

The operation needs no detailed explanation. A section of the water at the bottom of the reservoir is cut off from the colder water above. This is in immediate contact with the surface that is heated by the heater; this water quickly reaches a higher temperature and starts rising. It escapes through the top port in the trap, thence runs through the tube $k$ into the tap and up through the gauge tube. If the water reaches the boiling point it will rise in the gauge tube in the same way that the water rises in a coffee percolator. It will then pass through the fixture $d$ back into the top of the reservoir and in this way the entire contents of the reservoir will be caused to boil and isolation of the tube contents from the boiling water will be eliminated. Under the new arrangement, the tube has boiling water before the larger part of the reservoir.

This arrangement has a further advantage —that hot water can be drawn through the tap almost immediately after the heating is started as the tap is in immediate contact with the trapped-off section at the bottom of the reservoir where the water first heats.

What we claim is:

1. In a sterilizer, the combination of a reservoir provided with a bottom, a controllable outlet therefor, a trap in the form of an inverted shallow removable cup arranged to rest on the bottom of the reservoir and provided with an outlet at the top, and a tube connecting said last mentioned outlet with the controllable outlet, and a heater for heating the water in the trap.

2. In a sterilizer, the combination of a reservoir, a heater at the bottom of the reservoir, a tap leading from the reservoir near the bottom and a removable trap in the form of an inverted shallow notched cup arranged to rest on the bottom of the reservoir and having a tubular connection with the tap for leading the heated water from the top of the trap directly to the tap.

3. In a sterilizer, the combination of a reservoir, a gauge tube connected with the reservoir, and a circularator including a trap at the bottom of the reservoir for circulating the hot water through the gauge tube to prevent the isolation of the contents of the gauge tube from the heat.

4. In a sterilizer, the combination of a reservoir, a gauge tube connected with the reservoir near the bottom and top thereof, a trap for trapping a section of the water at the bottom of the reservoir and into the bottom of the gauge tube and out the top of the tube back into the reservoir and means for heating the bottom of the reservoir.

5. In a sterilizer, the combination of a reservoir, a heater at the bottom of the reservoir, a tap leading from the bottom of the reservoir, a gauge tube communicating with the tap at the bottom and with the reservoir at the top, and a trap arranged to divide off a section of the water at the bottom of the reservoir and direct the same into the tap and gauge tube.

6. In a liquid heating device, the combination of a reservoir adapted to contain water, a controllable outlet for the reservoir, a heater for the reservoir below the bottom thereof, removable means open at its bottom and co-operating with the bottom of the reservoir for trapping a small section of the water adjacent the heater, and means for directing said water from the top of the trapping means to the outlet.

In testimony whereof we affix our signatures.

CHAUNCEY R. PELTON.
HAROLD W. HOUGHTON.